United States Patent [19]

Harrod

[11] Patent Number: 4,709,958
[45] Date of Patent: Dec. 1, 1987

[54] RIDABLE VEHICLE AND ASSEMBLY METHOD

[75] Inventor: Lawrence R. Harrod, Fort Wayne, Ind.

[73] Assignee: Kransco Manufacturing, Inc., San Francisco, Calif.

[21] Appl. No.: 910,019

[22] Filed: Sep. 22, 1986

[51] Int. Cl.⁴ .......................... B62D 25/08; B62K 9/00
[52] U.S. Cl. ..................................... 296/177; 296/186; 296/196; 296/31 P; 296/205; 296/209; 296/35.1
[58] Field of Search .............. 296/31 P, 177, 193–197, 296/185, 205, 209, 186, 1 B, 35.1; 280/1.11 R, 785; 180/89.1, 311

[56] References Cited

U.S. PATENT DOCUMENTS

| | | | |
|---|---|---|---|
| 2,973,220 | 2/1961 | White | 296/193 X |
| 4,453,763 | 6/1984 | Richards | 296/185 |
| 4,513,981 | 4/1985 | DeGraaff et al. | 296/177 X |

Primary Examiner—Dennis H. Pedder
Attorney, Agent, or Firm—Kolisch, Hartwell & Dickinson

[57] ABSTRACT

A child's ridable vehicle is disclosed which includes generally first and second body portions with proximal ends overlapped and secured at alignment apertures to a frame of the vehicle. The second body portion overlaps the first body portion at sill portions of each which are inverted U-shaped sections overlapped on the frame. The second body portion has a unitary post bushing passing through the alignment aperture in the first body portion and into an aperture in the frame to be secured by a threaded fastener and this locates both body portions relative to each other and to the frame. The two body portions may be assembled by placing them at a wide angle V and nesting them together then straightening out the two parts to be in common plane and mating them with the frame with a threaded fastener inserted through the frame and securing the two overlapped body portions to the frame.

7 Claims, 8 Drawing Figures

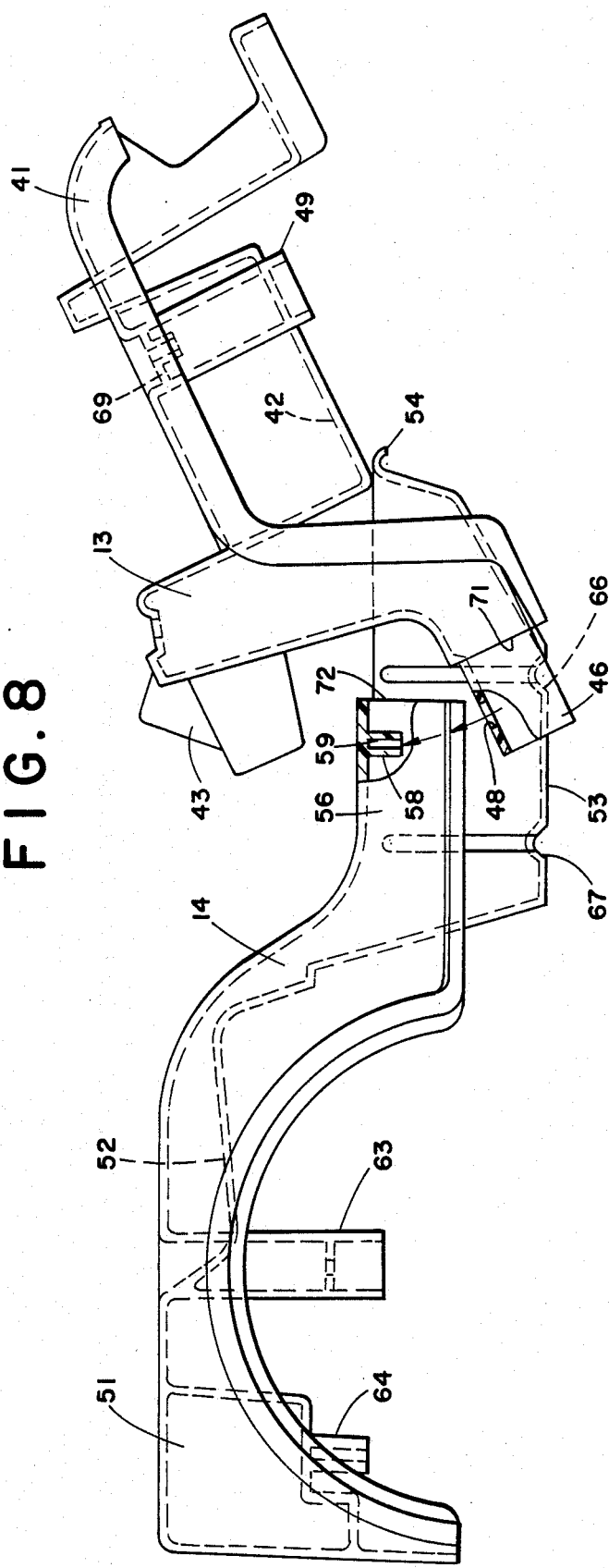

RIDABLE VEHICLE AND ASSEMBLY METHOD

BACKGROUND OF THE INVENTION

Many different wheeled vehicles have been used by children from early wagons to the pedal crank foot propelled vehicles popular decades ago. More recently electrically propelled vehicles with on board battery power have been popular. The material used in construction was originally a wooden body with some metal parts, then an all metal body became popular, and now plastic body components are more usual. The plastic body parts may be made by different processes and a popular form is injection molded plastic parts. In the larger size vehicles approaching four feet long this would mean the injection molded part might need to be four feet long and this is one which requires an exceptionally large and powerful injection molding machine to properly assemble these body parts to form a finished body for a ridable child's vehicle. This can create problems of misalignment of parts and also excess labor in the problems of attempting to assemble many different parts.

SUMMARY OF THE INVENTION

This assembly problem is solved by a child's ridable vehicle comprising, in combination first and second complementary plastic body portions, one of said body portions being the front and the other being the rear of a body for a child's vehicle, a frame including first and second longitudinal frame members each with an intermediate portion, first and second inverted generally U-shaped sill portions on said first body portion adapted to overlie the intermediate portion of said first and second longitudinal frame members, respectively, first and second inverted generally U-shaped sill portions on said second body portion adapted to overlap and be complementary to said first body portion sill portions, an alignment aperture in each said sill portion, and fasteners securing said overlapped sill portions to said frame at said alignment apertures.

The problem is further solved by the method of assembling a child's ridable vehicle having a frame having first and second longitudinal frame members each with an intermediate portion, first and second complementary plastic body portions with one for the front and the other for the rear of the completed vehicle and one body portion having a depressed floor pan, each body portion having first and second inverted U-shaped sill portions each with an alignment aperture, said method including the steps of disposing said first and second body portions at a wide angle V and inserting said sill portions of said first body portion into said sill portions of said second body portion and then opening out the V shape of said two body portions to be aligned in a common plane, subsequently mating said aligned body portions with said frame with said sill portions being overlapped on the intermediate portions of said longitudinal frame members and with said floor pan adjacent said intermediate portions, and fastening said overlapped sill portions to said frame at said alignment apertures.

Accordingly an object of the invention is to provide a child's ridable wheeled vehicle wherein first and second body parts are overlapped and secured to a frame by fasteners through alignment apertures in the two body portions.

A still further object of the invention is to provide a method to assemble two body portions of a child's ridable vehicle by placing them in a wide spread V angle and inserting the proximal ends into overlapping relationship and then opening out the V to be in a plane which body portions may then be secured to a vehicle frame.

Other objects and a fuller understanding of the invention may be had by referring to the following description and claims, taken in conjunction with the accompanying drawing.

BRIEF DESCRIPTION OF THE DRAWINGS

FIG. 8 is a side elevational view of the two body portions during assembly.

DETAILED DESCRIPTION OF THE PREFERRED EMBODIMENT

Figure 6:
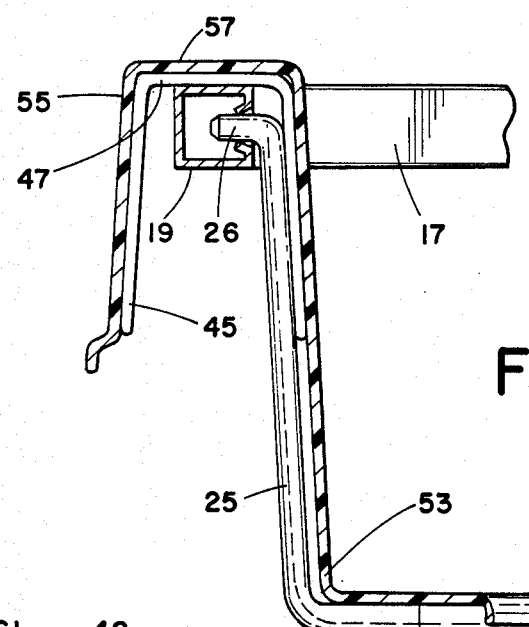
FIG. 6 is a sectional view on line 6—6 of FIG. 2.

The figures of the drawing illustrate a child's ridable wheeled vehicle 11 and the method of assembly. This vehicle 11 includes three main parts: a frame 12 and first and second body portions 13 and 14, respectively. The frame 12 is better illustrated in FIG. 3 in which the body portions 13 and 14 are shown only in phantom. In the preferred embodiment, the frame 12 is made from first and second longitudinal frame members 17 and 18 which may be made from square steel tubing each with an intermediate portion 19 and 20, respectively, which are bent outwardly to lie at the sill portions of the completed vehicle. First and second transverse members 21 and 22 are fixedly secured to the longitudinal members, for example by welding, to thus provide rigidity and stiffness to the entire frame 12. Third, fourth and fifth transverse frame members 23, 24 and 25 are provided and may be cylindrical rods of metal such as steel. The third transverse frame member 23 is loosely fitted in apertures in the longitudinal members 17 and 18. The fourth and fifth transverse frame members 24 and 25 are generally U-shaped with L-shaped ends 26 as shown in FIGS. 4 and 6. These L-shaped ends fit rather loosely in apertures in the intermediate portions 19 and 20 of the frame and are used to support the floor pan as described below. King pins 29 and 30 are also journalled on the frame 12 by passing through the first transverse frame member 21. These king pins 29 and 30 are unitary with spindles 31 and 32, respectively, on which the front wheels of the vehicle are journalled. A usual steering mechanism 33 is provided to turn the king pins 29 and 30 under guidance of a steering wheel 34. Four post bushings 35 are provided affixed to the frame 12 and these may be steel cups welded to the frame members. Two of these post bushings at the front of the vehicle surround the king pins 29 and 30 and the remaining two are at the rear on the second transverse frame member 22, and surround locator posts 37 and 38 affixed to the frame.

Figure 7:
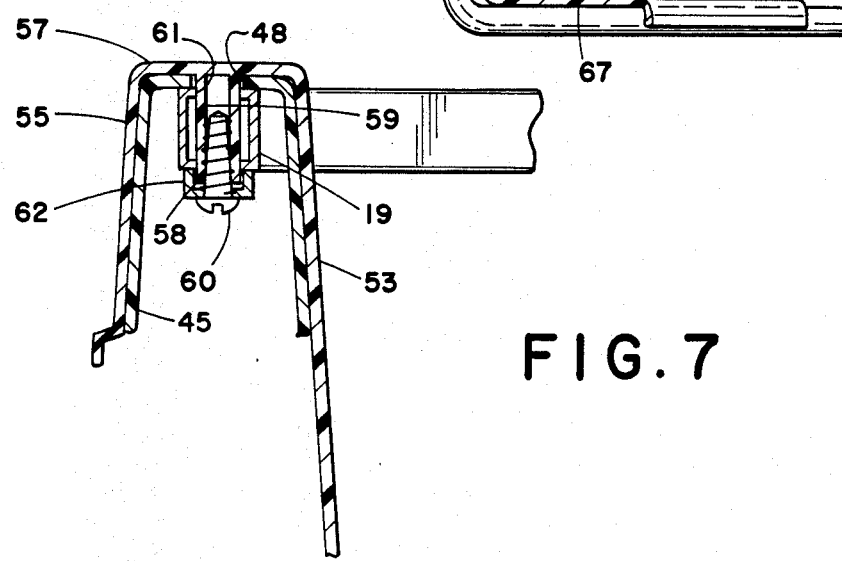
FIG. 7 is sectional view on line 7—7 of FIG. 2.

The first body portion 13 includes generally the front of the vehicle and the second body portion 14 the rear of the vehicle. These two body portions 13 and 14 are better shown in FIG. 8, without all of the added parts which make the complete vehicle. The first body portion 13 is a unitary part and includes generally the front fenders 41, a battery box 42, the instrument panel 43 and first and second proximal sill portions 45 and 46, respectively. Each of these sill portions is generally an inverted U-shape, with the bight 47 of the U being at the top and overlying the intermediate portions 19 and 20 of the longitudinal frame members. Alignment apertures 48 are provided in each of the sill portions 45 and 46, as shown in FIGS. 7 and 8. The first body portion 13 also includes unitary posts 49 which are received in the front post bushings 35 on the frame 12.

The second body portion 14 includes generally the rear quarter panels 51 with fender openings for the rear wheels, the seat base 52, a depressed floor pan 53, a hook 54 on the front or proximal end of the floor pan, and first and second sill portions 55 and 56 at the front or proximal end of this second body portion 14. All of the aforementioned parts are unitary and made in a single injection molded part. The first and second sill portions 55 and 56 are generally an inverted U-shape, as shown in FIGS. 6, 7 and 8 and are complementary to the sill portions 45 and 46, respectively, on the first body portion 13. The inverted U-shape has a bight 57 of the U which is generally flat, horizontal and is complementary to and laps over the respective sill portion 45 and 46. Each sill portion 55 and 56 has a unitary post bushing 58, each of which contains an alignment aperture 59 into which a screw 60 with a washer 62 is installed. The post bushing 58 is received in the alignment aperture 48 of the first body portion 13, as shown in FIG. 7, and passes through apertures 61 in the intermediate portions 19 and 20 of the frame to locate the two body portions on the frame. The rear body portion 14 also includes unitary locator posts 63 which fit inside the post bushings 35, at the rear of the frame and unitary post bushings 64 secured near the rear of each frame by a sheet metal screw 65. The rear body portion floor pan 53 also includes two transverse grooves 66 and 67 to receive the U-shaped transverse frame members 24 and 25 respectively.

Figure 1:
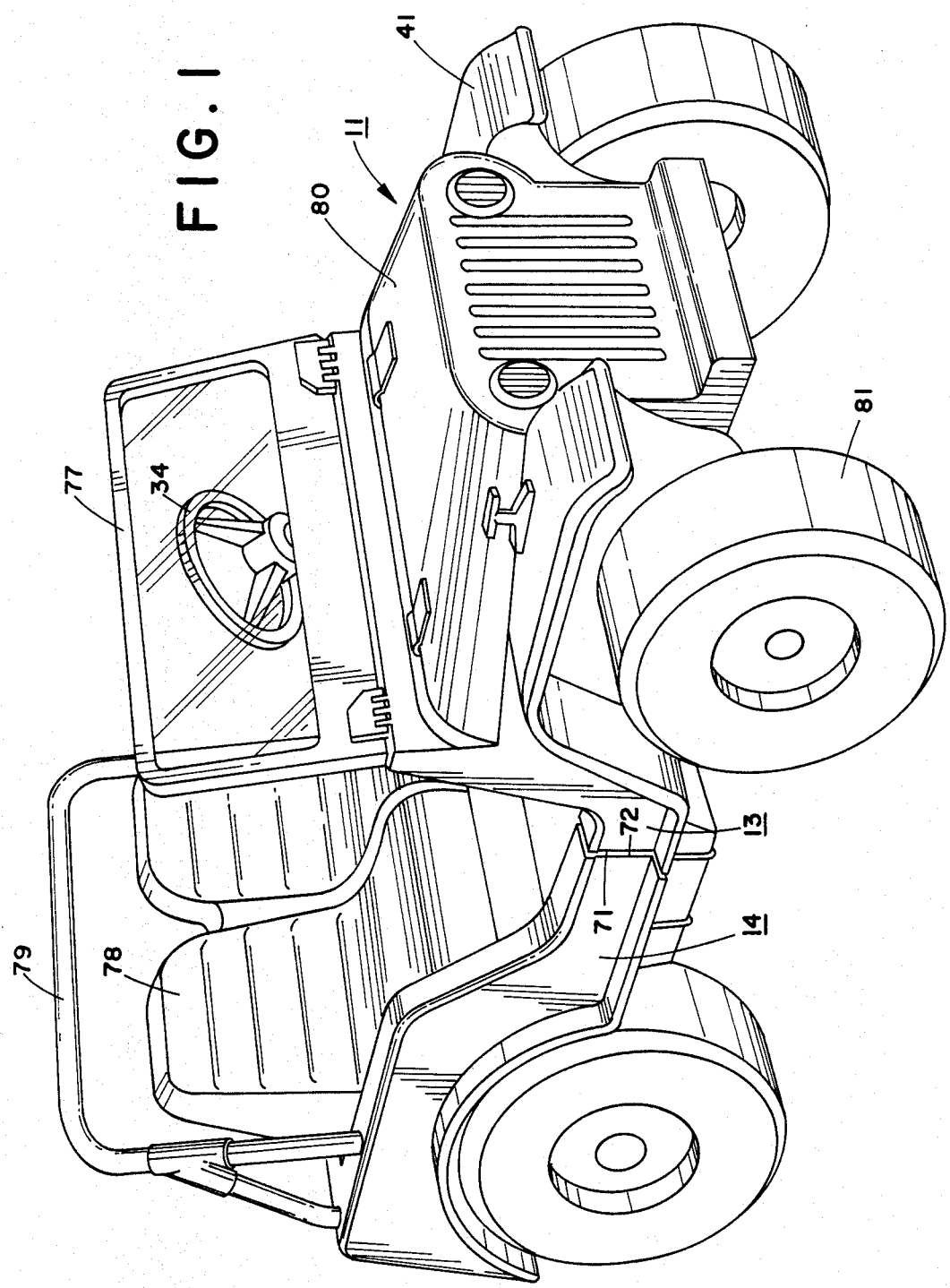
FIG. 1 is a perspective view of the completed child's ridable vehicle.
Figure 2:
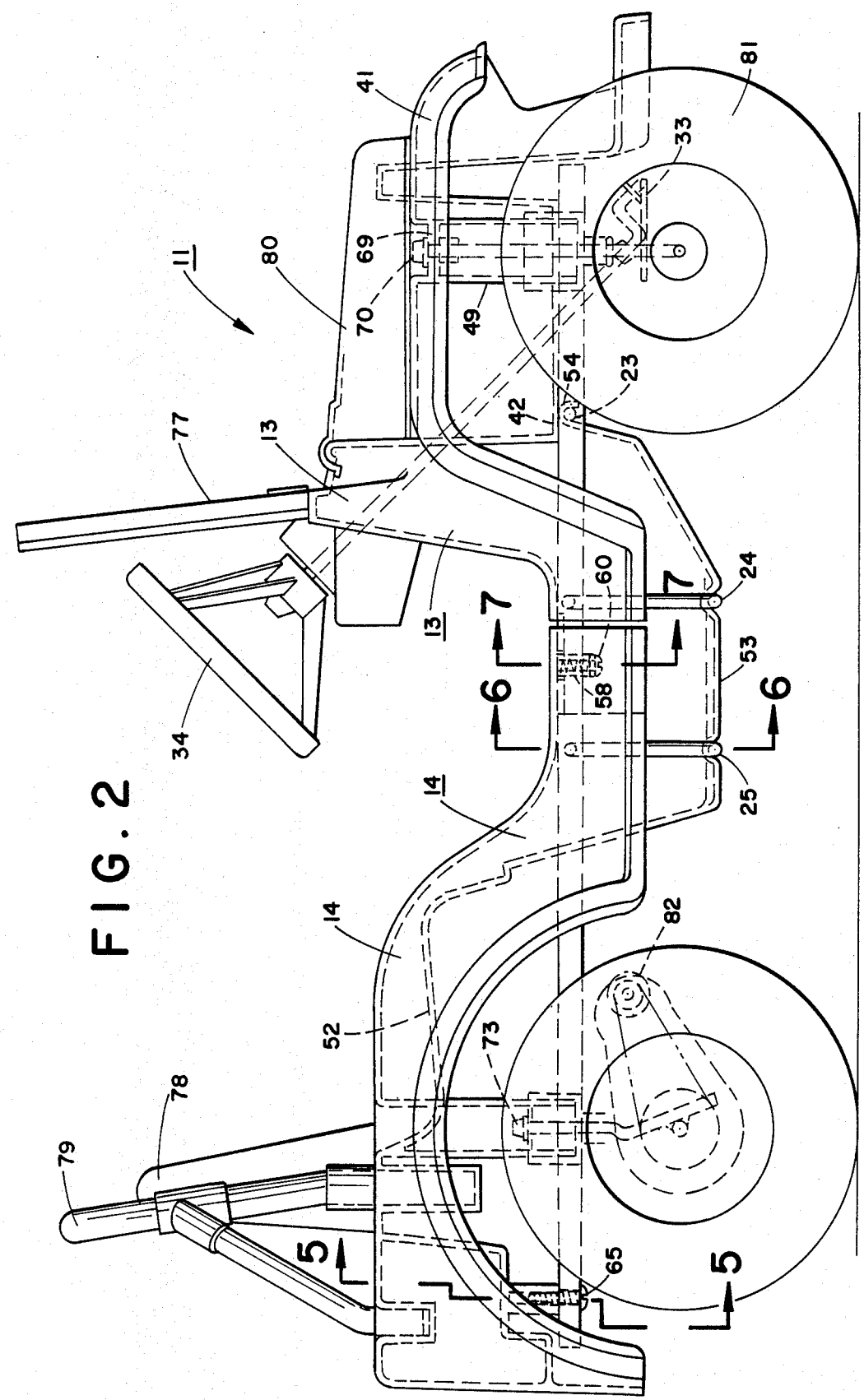
FIG. 2 is a side elevational view of the vehicle of FIG. 1.
Figure 3:
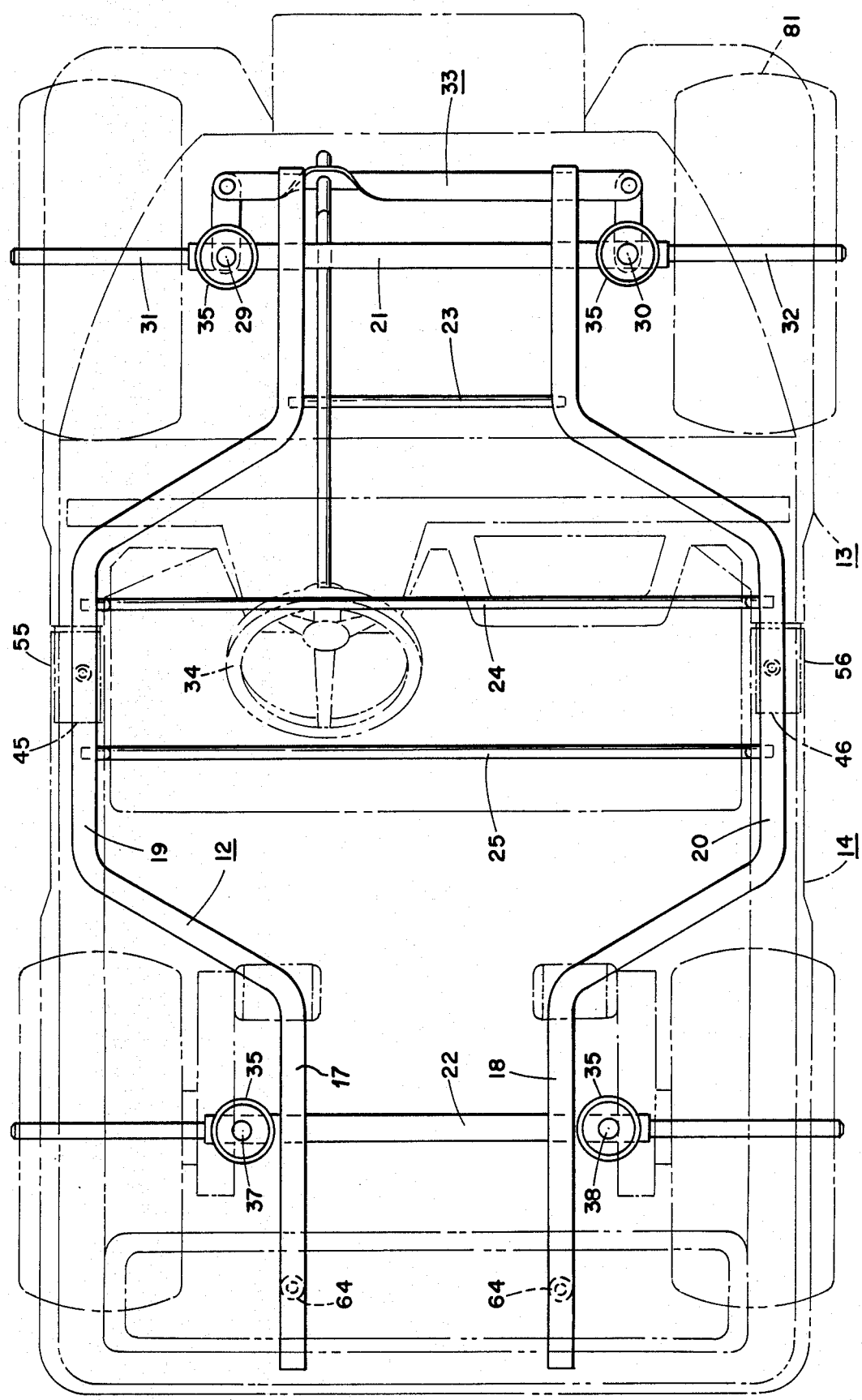
FIG. 3 is a plan view of a vehicle frame with the body shown in phantom lines.
Figure 4:
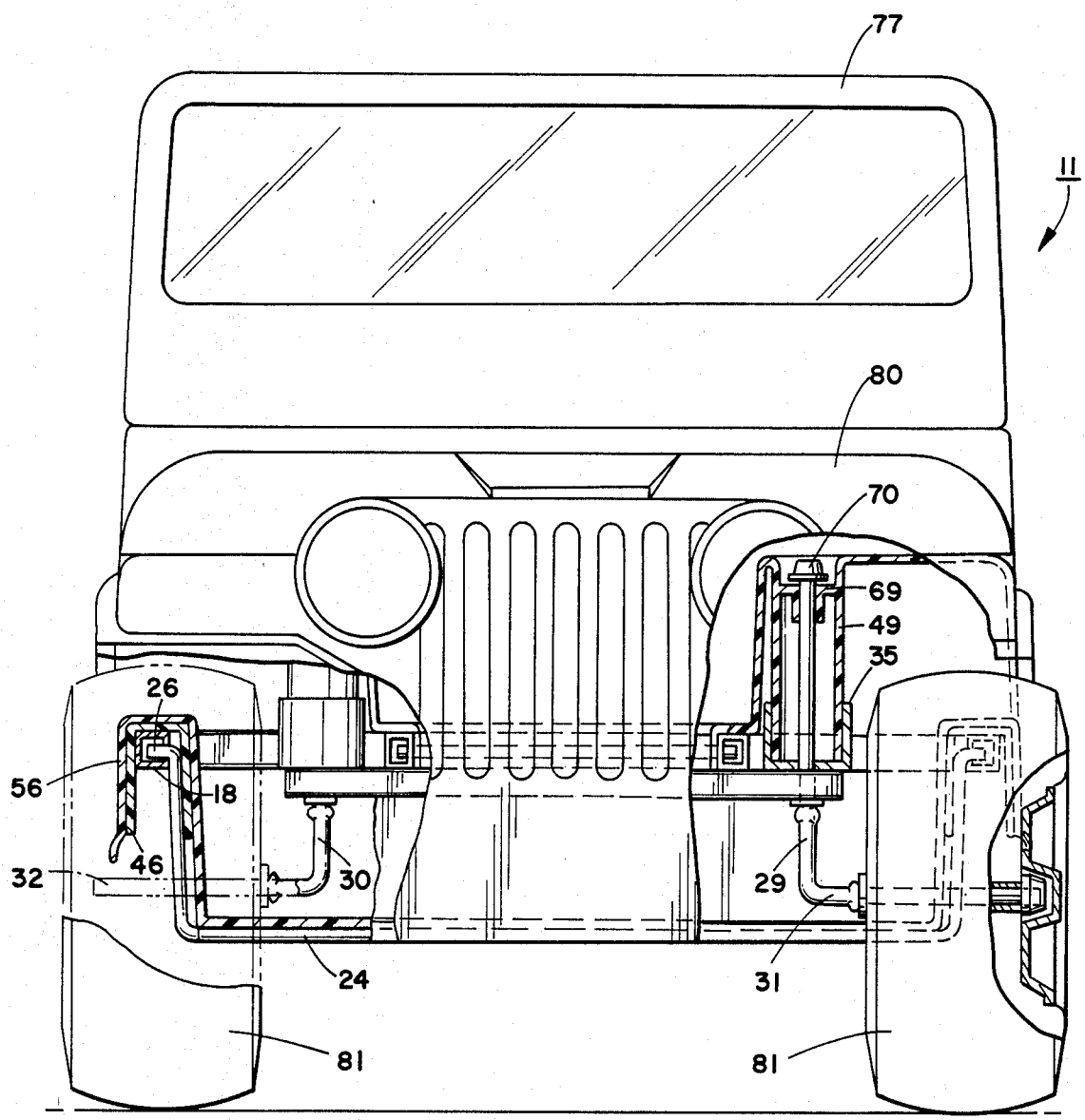
FIG. 4 is a front elevational view of the completed vehicle.
Figure 5:
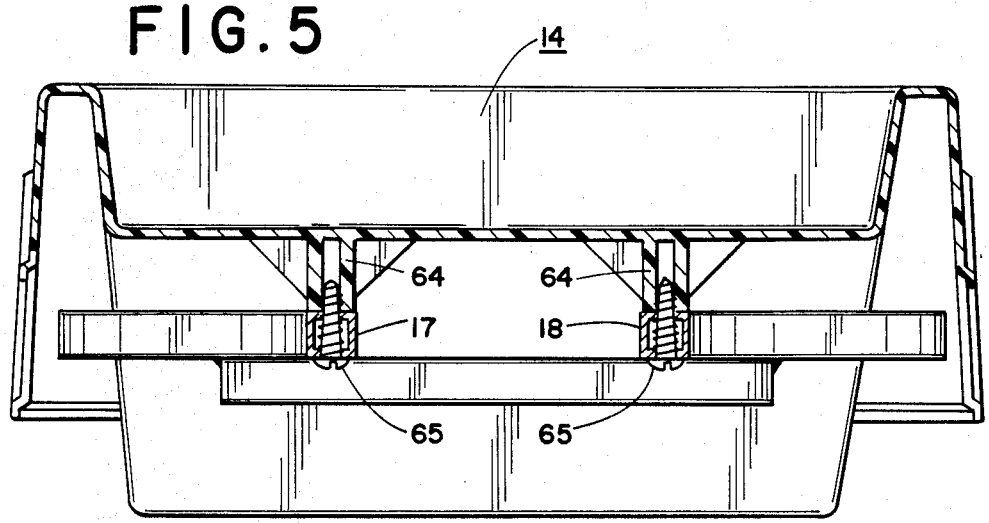
FIG. 5 is a sectional view on line 5—5 of FIG. 2.

The assembly of the vehicle 11 starts with the frame 12 being prepared as shown in FIG. 3. The frame will include the parts 17 through 33 and welded or secured as specified above. This frame will normally be disposed horizontally and the body portions 13 and 14 disposed above them. These body portions would be disposed as shown in FIG. 8 at a wide angled V with the proximal portions disposed adjacent each other. The battery box 42 may be rested on the top of the hook 54 and the forward end of the body portion 13 raised to the position shown in FIG. 8. This makes the sill portions 45 and 46 on the first body part straddling the floor pan 53 and below the sill portions 55 and 56 on the second body portion 14. The post bushings 58 on the sill portions 55 and 56 are one reason why this wide angle V is required and then the front end of the first body portion 13 may be lowered to pivot the sill portions 45 and 46 up into nested or overlapped position with the sill portions 55 and 56. This will make the two body portions in planar alignment and then the two body portions may be lowered onto the frame 12. In straightening the two body portions into alignment, the alignment apertures 48 in the sill portions 45 and 46 will be received on the post bushings, and the alignment apertures 48 may be slightly elongated to permit this. Then these post bushings 58 will be received in the apertures 61 in the intermediate portions of the longitudinal frame members 17 and 18. This locates the first body portion 13 relative to the second body portion 14 and locates both relative to the frame 12. When the body portions 13 and 14 are mated with the frame 12, there are other locators for the body and frame. Two of these locators are at the front of the vehicle where the unitary posts 49 are received in the post bushings 35 and the king pins 29 and 30 extend up through a flange 69. A friction cap 70 may be placed on the top of these king pins, and this retains the front of the body on the frame. Plastic engaging metal screws 60 may be driven from below up into the post bushings 58. At this time a seam edge 71 on the first body part 13 will be closely adjacent a seam edge 72 on the second body portion 14. The dimensional tolerance between the king pin apertures and the alignment apertures 48 will determine the closeness of the seam edges 71 and 72.

When the first and second body portions are mated with the frame 12, there are additional locators on the second body portion 14. The post bushings 63 will be received in the post bushings 35 on the frame and pass over the locator posts 37 and 38. Friction caps 73 may be placed on these locator posts to secure the body portion 14 to the frame. Also, the post bushings 64 will rest on the rear end of the frame and may be secured thereto by the sheet metal screws 65 into preformed apertures in the frame again to secure the rear of the vehicle to the frame. The U-shaped transverse frame members 24 and 25 will be nested in the grooves 66 and 67, respectively, to provide reinforcement for the depressed floor pan, for example, when a child stands up in the vehicle. The front end of the second body portion 14 is narrowed, generally in accordance with the narrowing of the frame members 17 and 18, and the hook 54 at the front end of this body portion 14 is sufficiently narrow to be hooked over the relatively short third transverse frame 23. This provides support for the front end of the floor plan, and the battery box 42 comes down to within a small distance, for example 1/16th of an inch, above the top of the hook 54. Since the battery box is a unitary part of the first body portion 13, the hook 54 cannot become disengaged from the transverse frame member 23.

After the two body portions are mated with the frame 12, the vehicle 11 may be completed by adding the steering column and steering wheel 34, a windshield 77, seats 78, roll bar 79, hood 80, wheels 81 and a power train including an electric motor 82 as well as other finishing touches.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A child's ridable vehicle comprising, in combination;

first and second complementary plastic body portions;
   one of said body portions being the front and the other of said body portions being the rear of a body for a child's vehicle;

a frame including first and second longitudinal frame members each with an intermediate portion;

first and second inverted generally U-shaped sill portions on said first body portion adapted to overlie the intermediate portion of said first and second longitudinal frame members, respectively;

first and second inverted generally U-shaped sill portions on said second body portion adapted to overlap and be complementary to said first body portion sill portions;

an alignment aperture in each said sill portion; and fasteners securing said overlapped sill portions to said frame at said alignment apertures.

2. A ridable vehicle as set forth in claim 1, including a unitary post on each of said sill portions of said second body portion, and said posts being received in said alignment apertures of said first body portion.

3. A ridable vehicle as set forth in claim 1, including a seam edge on each of said body portions; and said fasteners securing said overlapped sill portions to said frame with said seam edges of said first and second body portions closely adjacent.

4. A ridable vehicle as set forth in claim 1, wherein said body portions overlap; and a part of said first body portion closely overlying the proximal end of said second body portion.

5. A ridable vehicle as set forth in claim 4, including a hook on said proximal end of said second body portion;

a part of said frame engaged by said hook; and said part of said first body portion closely overlying said hook to retain said hook on said frame.

6. A ridable vehicle as set forth in claim 1, including a floor pan on one of said body portions with a hook on one end thereof;

a transverse member in said frame; and said hook disposed on said transverse member to support said one end of said floor pan from said frame.

7. A ridable vehicle as set forth in claim 6, including U-shaped transverse members supported by said frame longitudinal members; and grooves in said floor pan receiving said U-shaped transverse members for support of said floor pan from said frame.

* * * * *

UNITED STATES PATENT AND TRADEMARK OFFICE
CERTIFICATE OF CORRECTION

PATENT NO. : 4,709,958
DATED : December 1, 1987
INVENTOR(S) : Lawrence R. Harrod It is certified that error appears in the above-indentified patent and that said Letters Patent is hereby corrected as shown below:

In column 2, line 13, after "vehicle" please insert the following: --. The grille depicted on the front of the vehicle in this figure is a registered trademark of Chrysler Corporation--.

In column 2, line 19, after "vehicle" please insert the following: --. The grille depicted on the front of the vehicle in this figure is a registered trademark of Chrysler Corporation--.

Signed and Sealed this

Second Day of September, 1997

Attest:

BRUCE LEHMAN

Attesting Officer

Commissioner of Patents and Trademarks